US008396718B2

(12) United States Patent
Au et al.

(10) Patent No.: US 8,396,718 B2
(45) Date of Patent: Mar. 12, 2013

(54) DETERMINING WHETHER A RESPONSE FROM A PARTICIPANT IS CONTRADICTORY IN AN OBJECTIVE MANNER

(75) Inventors: Wai Ho Au, Seattle, WA (US); Magdi Morsi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 12/143,881

(22) Filed: Jun. 23, 2008

(65) Prior Publication Data

US 2009/0319332 A1  Dec. 24, 2009

(51) Int. Cl.
G06Q 10/00 (2012.01)
(52) U.S. Cl. ........................................ 705/1.1
(58) Field of Classification Search .................... None
See application file for complete search history.

(56) References Cited

U.S. PATENT DOCUMENTS

| | | | |
|---|---|---|---|
| 6,347,332 B1 | 2/2002 | Malet et al. | |
| 7,209,895 B2 | 4/2007 | Kundtz et al. | |
| 2002/0049738 A1 | 4/2002 | Epstein | |
| 2003/0078804 A1 | 4/2003 | Morrel-Samuels | |
| 2006/0155513 A1 | 7/2006 | Mizrahi et al. | |
| 2006/0288041 A1 | 12/2006 | Plastina et al. | |
| 2007/0033092 A1 | 2/2007 | Iams | |
| 2007/0282670 A1 | 12/2007 | Repasi et al. | |
| 2009/0125320 A1* | 5/2009 | Bickett | 705/1 |
| 2009/0249186 A1* | 10/2009 | Fetzer | 715/234 |

FOREIGN PATENT DOCUMENTS

WO  02079901 A3  10/2002

OTHER PUBLICATIONS

"Consumers' Contradictions: Value and Other Brand Attributes", Date: Mar. 2000, 8 Pages http://www.quirks.com/articles/a2000/20000306.aspx?searchID=3333840.
"Concept Testing" http://www.infosurv.com/concept-test.htm, Dec. 17, 2007.
"Epinions" http://www.epinions.com/about/, Dec. 17, 2007.
Pollach Irene, "Electronic Word of Mouth: A Genre Analysis of Product Reviews on Consumer Opinion Web Sites", System Sciences, 2006. HICSS apos;06. Proceedings of the 39th Annual Hawaii International Conference, Date: Jan. 4-7, 2006, vol. 3, pp. 1-10.

* cited by examiner

Primary Examiner — Jonathan Ouellette (57) ABSTRACT

If a response is with a threshold of the predicted response, then the contradictory response is classified as being independent and it is not truly contradictory. If a response is beyond a threshold, the response is classified as not being independent and is likely worthy of further investigation.

20 Claims, 4 Drawing Sheets

DETERMINING WHETHER A RESPONSE FROM A PARTICIPANT IS CONTRADICTORY IN AN OBJECTIVE MANNER

BACKGROUND

This Background is intended to provide the basic context of this patent application and it is not intended to describe a specific problem to be solved.

Feedback is often used to improve products and services. Surveys are communicated and responses are received and the response may be used to identify problems, weaknesses, strengths, advantages, desired improvements, etc. An assumption is made that all the responses are valid and are not fraudulent. Trying to determine whether a response is not fraudulent has been a challenge. For example, a user may have very particular tastes and those tastes may be difficult to satisfy. On the other hand, a user may not have even used a product or a service and may provide a negative response simply to punish the producer of the product or service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Trying to determine whether a response is fraudulent or not has long been a challenge. A matrix may be created to compare the responses for a user to what is an authoritative response predicts should be the response. If the response is within a threshold of the predicted response, then the contradictory response is classified as being independent and it is not truly contradictory and not fraudulent. If the response and predicted response are beyond a threshold of each other, then the responses are not independent and the conclusion is that the response was submitted with a fraudulent intent. In order to avoid the issue of setting a threshold, statistics also can be used to determine with known levels of confidence whether a response is truly independent. An adjusted residual may be calculated where the adjusted residual measures the difference in the actual and expected numbers in a cell of the contingency table. As the adjusted residual is in an approximate standard normal distribution, it may be used to determine whether the difference between the actual and the expected number is statistically significant. If the different response is statistically correlated with the authoritative response, then it can be inferred that the response is contradictory with a statistical level of confidence. These contradictory assessments are potentially fraudulent and hence they are worthy of further investigation.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
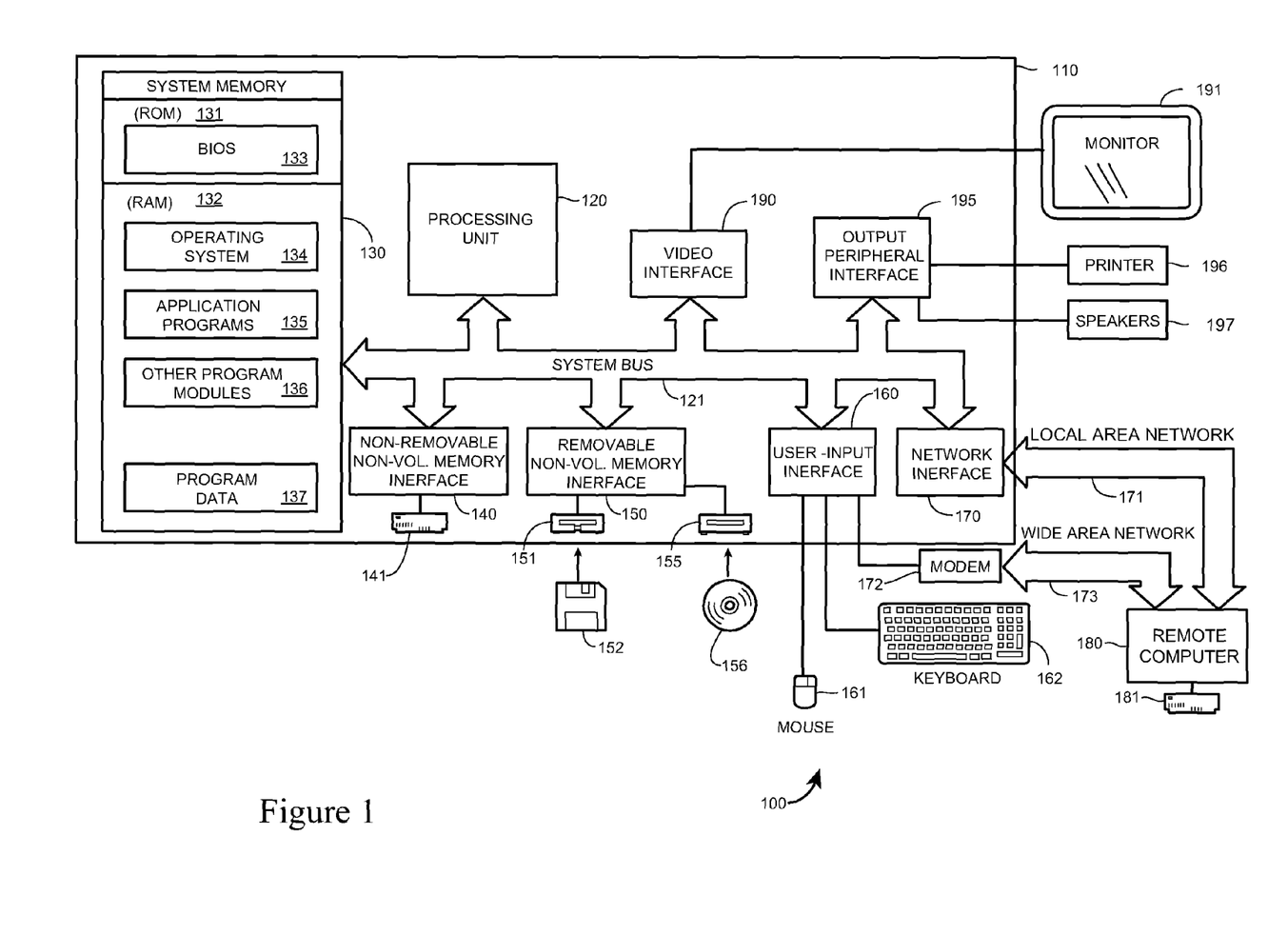
FIG. 1 is an illustration of a computing system that may be used to execute computer executable code according to the claims.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
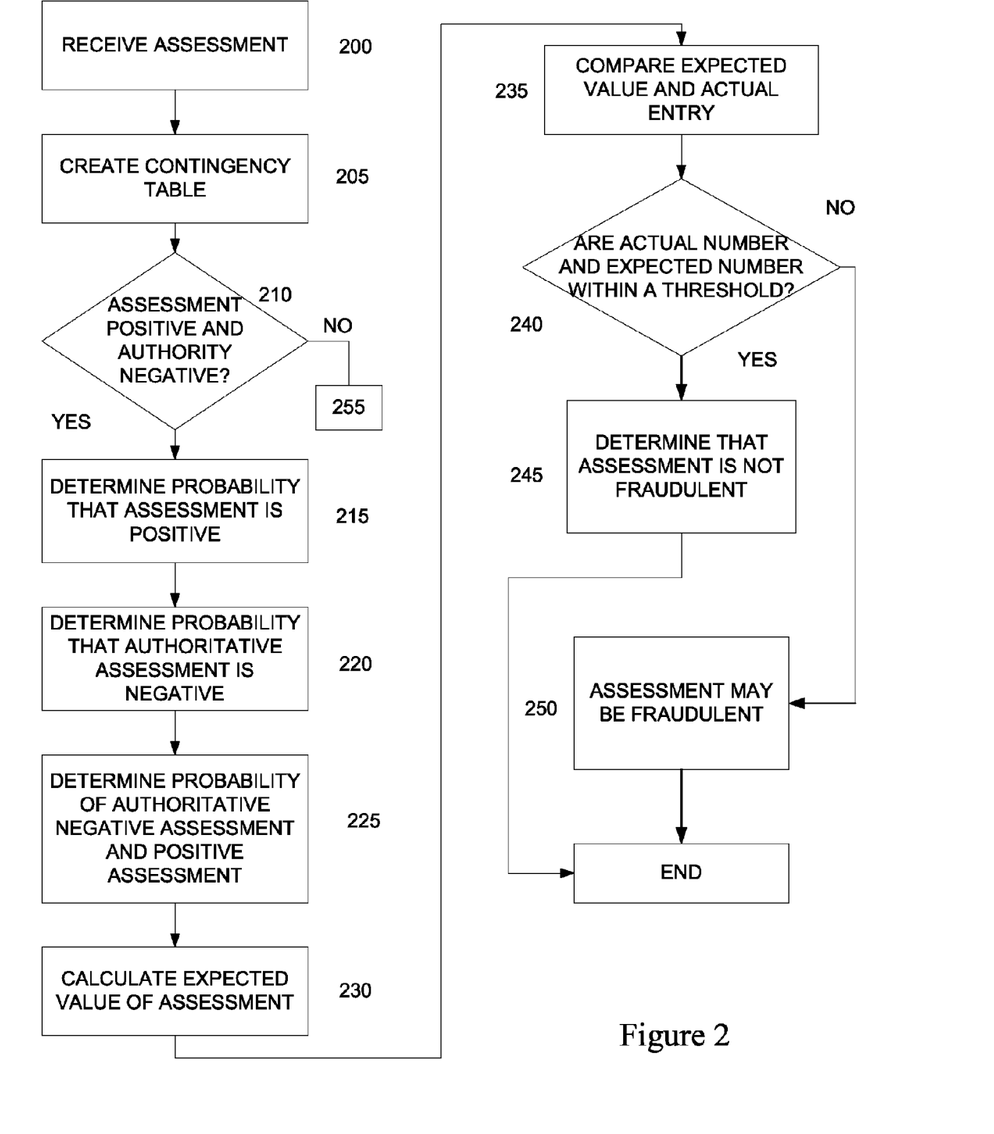
FIG. 2 is an illustration of a method determining whether a response from a participant is contradictory in an objective manner.

FIG. 2 may illustrate a method of determining whether a response from a participant is contradictory in an objective manner. A problem with soliciting opinions is that an assumption has to be made that the opinions are not fraudulent or purposely contrary. Manners to evaluate whether an opinion is valid or fraudulent have been difficult to design and trust. To alleviate the problem, the method performs a contradiction analysis. The contradiction analysis attempts to identifying the participants who have provided contradictory assessments (i.e., the assessments that deviate from the norm significantly). These contradictory assessments are potentially fraudulent and hence they are worthy of further investigation.

At block 200, an assessment may be received. The assessment may be a view on virtually anything such as a product, a service, a combination of products and services or virtually anything else users may have an opinion. The assessment may be a negative assessment or a positive assessment. In another embodiment, the assessments may be on a scale where there are a variety of levels of positive and negative assessment.

At block 205, a contingency table may be created. The contingency table may compare an authoritative positive assessment and an authoritative negative assessment to a positive assessment and a negative assessment from a user, such as user A. Below may be a sample contingency table.

|  |  | Norm | |
|---|---|---|---|
|  |  | Positive | Negative |
| A's Assessment | Positive | $n_1$ | $n_2$ |
|  | Negative | $n_3$ | $n_4$ |

The entries in the table $n_1$, $n_2$, $n_3$, and $n_4$ may be numbers. n1 may be the number of objects that both A's assessments and the norms are positive and may be referred to as the positive agreement entry. Entry $n_2$ may be the number of objects that A's assessments are positive but the norms are negative and may be referred to as the positive disagreement entry. Entry $n_3$ may be the number of objects that A's assessments are negative while the norms are positive and may be referred to as the negative disagreement entry. Entry $n_4$ may be the number of objects that both A's assessments and the norms are negative and may be referred to as the negative agreement entry. In the contingency table, $n_1$ and $n_4$ are the number of objects that A's assessments are the same as the norms, whereas $n_2$ and $n_3$ are the number of objects that A's assessments are different from the norms. In other words, $n_1$ and $n_4$ are the number of objects with consistent assessments, while $n_2$ and $n_3$ are the number of objects with inconsistent or contradictory assessments.

The authoritative assessment of an object is considered the norm. If the authoritative assessment is positive, the norm of the object will be 1; otherwise, it will be 0. In case that the object has no authoritative assessment, the community assessments of the object may be used as the norm. If x % of the community assessments is positive, the norm will be x % positive and 1−x % negative. The authoritative assessment may be thought of as the logical assessment.

The table may continue to grow as more assessments are received. For example, for each object that A has provided any assessment and the object has an authoritative assessment, the table may change as follows:

| A's Assessment | Authoritative Assessment | Result |
|---|---|---|
| Positive | Positive | $n_1 = n_1 + 1$ |
| Positive | Negative | $n_2 = n_2 + 1$ |
| Negative | Positive | $n_3 = n_3 + 1$ |
| Negative | Negative | $n_4 = n_4 + 1$ |

If the object has community assessments, but no authoritative assessment, the method may take into account the community assessments provided by all the community participants other than A. If m is the number of community assessments the object has, the table may change as follows:

| A's Assessment | Community Assessments | | Result |
|---|---|---|---|
| | Positive | Negative | |
| Positive | $(m \times x\% - 1)/(m - 1)$ | $1 - (m \times x\% - 1)/(m - 1)$ | $n_1 = n_1 + (m \times x\% - 1)/(m - 1)$ |
| | | | $n_2 = n_2 + (1 - (m \times x\% - 1)/(m - 1))$ |
| Negative | $m \times x\%/(m - 1)$ | $1 - m \times x\%/(m - 1)$ | $n_3 = n_3 + m \times x\%/(m - 1)$ |
| | | | $n_4 = n_4 + (1 - m \times x\%/(m - 1))$ |

In other words, the contingency table may be created by determining a positive agreement entry wherein the positive agreement entry includes the number of community assessment multiplied by a result of a positive percentage of positive assessments minus one divided by the number of community assessments less one. A negative agreement entry may be determined where the negative agreement entry includes one less a sum of the number of community assessments multiplied by the percentage of positive assessments less one, the sum divided by the number of assessments less one. A positive disagreement entry may be determined where the positive disagreement entry includes the number of community assessments multiplied by the percentage of positive assessments divided by the number of assessments minus one. In addition, a negative disagreement entry may be determined where the negative disagreement entry includes one less the number of community assessments multiplied by the percentage of positive answers divided by the number of community assessments less one. If the only assessment is from A, the assessment may be ignored.

At block 210, a determination may be made whether the assessment is positive and an authoritative assessment is negative. If this determination is negative, the method continue to block 255. If this determination is true, at block 215, the probability that the assessment is positive may be determined. In one embodiment, the probability is determined by dividing the number of assessments that are positive by the total number of assessments. In mathematical term, the probability may be calculated by:

$$p_1=(n_1+n_2)/N,$$

where $N=n_1+n_2+n_3+n_4$.

At block 220, the probability that the authoritative assessment is negative may be determined by dividing the number of authoritative entries that are negative by the total number of assessments. In mathematical terms, the probability that the norm is negative may be computed by:

$$p_2=(n_2+n_4)/N.$$

At block 225, to determine the expected entry of a positive assessment and a negative authoritative assessment, the probability that the assessment is positive is multiplied by the probability that the authoritative assessment is negative. If A's assessment and the norm are independent of each other, the probability that A's assessment is positive, but the norm is negative is given by, in mathematical terms:

$$p=p_1p_2.$$

At block 230, the expected number for $n_2$ is calculated. The number is calculated by multiplying the probability from step 225 by the number of total number of assessment. In mathematical terms, the expected number is calculated by:

$$pN.$$

At block 235, the expected entry (pN) and the actual entry ($n_2$) are compared. At block 240, the method determines whether actual number $n_2$ and the expected number pN are within a threshold of each other.

At block 245, if the actual number, $n_2$, and the expected number, pN, are more or less the same (i.e., $n_2 \approx pN$) or within a threshold of each other, such as 10%, the event that A's assessment is positive and the event that the norm is negative are independent of each other. In other words, these two events simply happen at the same time by chance. A has not provided any contradictory assessments of such kind on purpose or to be fraudulent. It should be noted that the threshold may be any appropriate threshold and may be modified by a user, manager, programmer, etc.

At block 250, if $n_2$ is greater than pN substantially (i.e., $n_2 >> pN$) or the difference is greater than a threshold, such as 10%, the event that A's assessment is positive and the norm is negative are correlated with each other. In other words, these two events do not happen by chance. A has intentionally provided the contradictory assessments. After blocks 245 or 250, the method may end or it may continue on to FIG. 3 and the steps illustrated therein.

At block 255, a determination is made whether the assessment is negative and the authoritative assessment is positive. If the determination is negative, the assessment are the same and the method may end. If the determination from block 255 is true, at block 260, the method may determine the probability that the assessment is negative by dividing the negative assessments by the total number of assessments. In mathematical terms:

$$r_1=(n_3+n_4)/N,$$

At block 265, the method may determine the probability that the authoritative assessment is positive by dividing the number of authoritative entries that are positive by the total number of assessments. In mathematical terms:

$$r_2=(n_1+n_3)/N$$

At block 270, the method may multiply the probability that the assessment is negative by the probability that the authoritative assessment is positive to determine if A's assessment and the norm are independent of each other. More specifically, the probability that A's assessment is negative, but the norm is positive is determined by multiplying the probability that the assessment is negative by the probability that the authoritative assessment is positive. In mathematical terms:

$$r=r_1r_2.$$

At block 275, the expected entry of a negative assessment and a positive authoritative assessment in the contingency table may be determined by multiplying the probability (r) calculated at block 270 by the total number of assessments (N).

At block 280, the expected entry (rN) may be compared to the actual entry ($n_3$). At block 285, the method may determine whether if the expected entry and actual entry are within the threshold of each other, such as 10%. If the determination at block 285 is yes, control may pass to block 290 and the assessment may be determined to be independent. In other words, the assessment was not fraudulent. At block 295, if the determination at block 285 was negative and that expected entry and actual entry are different by more than the threshold, at block 295, the assessment may be determined to not be independent and that the assessment was fraudulent. After block 290 or 295, the method may end or continue on to FIG. 3.

Figure 3:
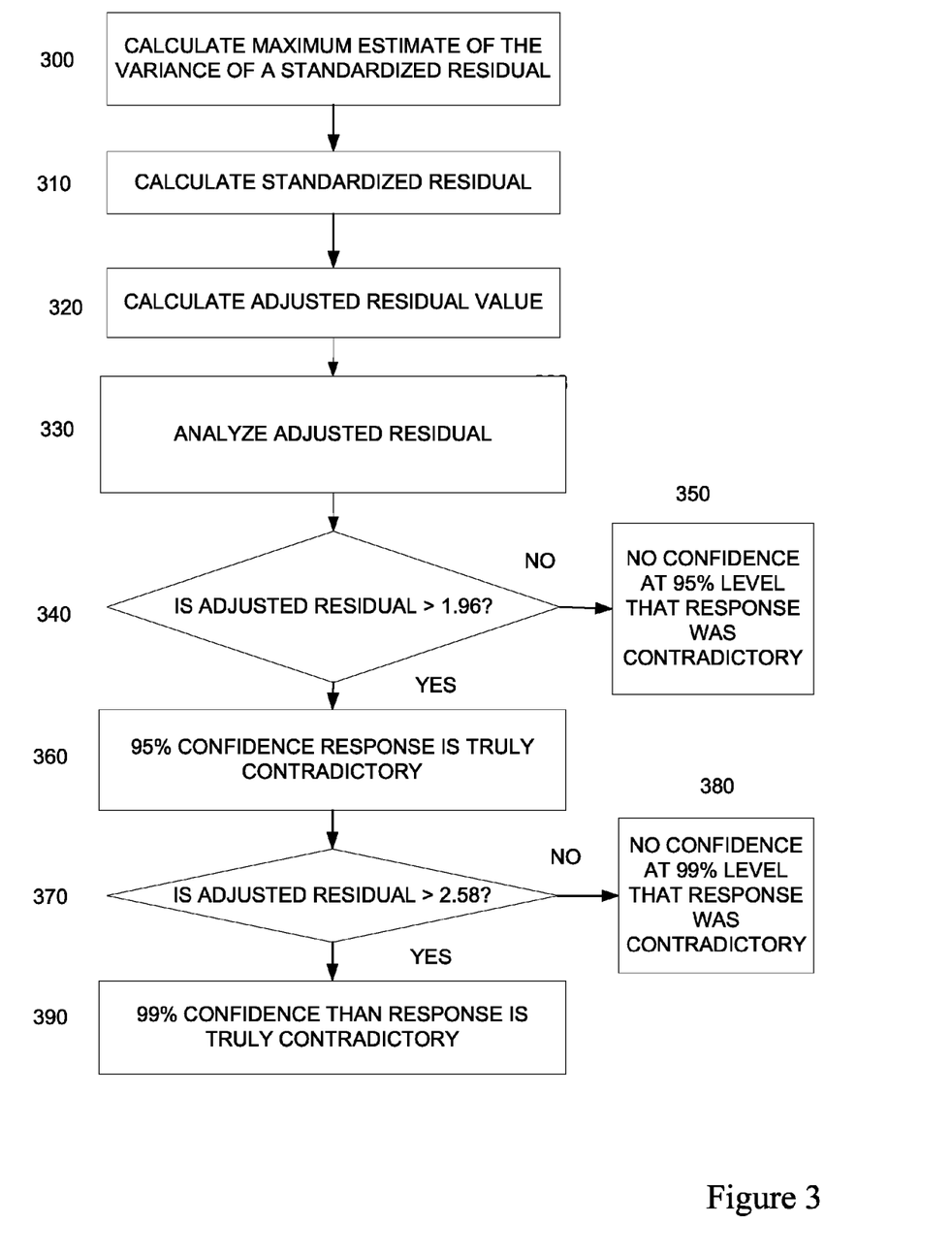
FIG. 3 is an illustration of a further method of using statistical analysis to further determine if a response from a participant is contradictory in an objective manner.

FIG. 3 may illustrate a further extension of the method. Setting the threshold may be a challenge. A first threshold may be acceptable to a first user but may not be acceptable to a second user. On the one hand, some contradictory assessments may not be filtered out if the threshold is set too high; on the other hand, some consistent assessments may be taken away if it is set too low. In many cases, there is little guidance about what the threshold should be and it can only be set in a trial-and-error manner. Accordingly, a more objective way to judge whether entries are correlated (or fraudulent) would be useful. If the difference is statistically significant, we can conclude that A provides contradictory assessments at certain level of confidence. FIG. 3 may illustrate using statistical analysis to add objective confidence levels to the correlation analysis. The method may adopt a statistic called adjusted residual. The adjusted residual measures the difference in the actual and the expected number in a cell of the contingency table. Calculating the adjusted residual may require some mathematical steps as described in FIG. 3.

At block 300, the maximum likelihood estimate of the variance of a standardized residual (z) may be calculated. The maximum likelihood estimate of the variance of the standardized residual (z) may be determined by multiplying a first value by a second value where the first value is one less the quantity of the positive assessments divided by the total number of assessment and the second value is one less the negative authoritative assessments divided by the number of assessments. In mathematical terms, the first value may be determined by;

$$v = \left(1 - \frac{n_1 + n_2}{N}\right)\left(1 - \frac{n_2 + n_4}{N}\right).$$

At block 310, the standardized residual (z) may be calculated. The standardized residual (z) may be defined as the entry of positive assessment and negative authoritative assessment in the contingency table less the expected value of the entry divided by the square root of the expected value of the entry. In the situation where there is no norm but community assessments, p may be replaced by r and $n_2$ is replaced with $n_3$ when negative assessment and positive authoritative assessment are considered. In mathematical terms;

$$z = \frac{n_2 - pN}{\sqrt{pN}}.$$

At block 320, the adjusted residual may be calculated for an entry in the contingency table, where the adjusted residual measures the difference between the actual and the expected entry in the contingency table. The adjusted residual is defined as dividing a standardized residual from block 310 by the square root of the maximum likelihood estimate of the variance of z of block 300. In mathematical terms;

$$d = \frac{z}{\sqrt{v}}.$$

At block 330, the adjusted residual is analyzed. At block 340, the method determines if the adjusted residual is greater than 1.96. If the determination at block 340 is no, at block 350, there is no confidence at the 95% level that the response was contradictory and the response may have been fraudulent. If the determination at block 340 is yes, then there is a 95% confidence that the assessments are contradictory and are valid contradictory assessments.

At block 370, the method determines whether the adjusted residual is greater that 2.58. If the determination at block 370 is no, at block 380, there is no confidence at the 99% level that the response was contradictory and the response may have been fraudulent. If the determination at block 370 is yes, at block 390, there is a 99% confidence level that the assessments are contradictory. At block 250, the objects that A reports positive are meant to be negative by the norm, whereas at block 295, the objects that A reports negative are meant to be positive by the norm. When the former and/or the latter are true, we conclude that A provides contradictory assessments.

EXAMPLE

Say that ten individuals participated in a community program. The authoritative and community assessments of certain objects are given below:

| Object | Authoritative Assessment | Community Assessment |
|---|---|---|
| A | Positive | N/A |
| B | Positive | N/A |
| C | Negative | Positive (20%)/Negative (80%) |
| D | Positive | N/A |
| E | Positive | N/A |
| F | Positive | N/A |
| G | N/A | Positive (90%)/Negative (10%) |
| H | Negative | N/A |

The norm of these objects is shown in the following:

| Object | Norm |
|---|---|
| A | Positive |
| B | Positive |
| C | Negative |
| D | Positive |
| E | Positive |
| F | Positive |
| G | Positive (90%)/Negative (10%) |
| H | Negative |

Further suppose that one of the community participants, John, supplied the assessments of the same objects. John's assessments of the objects are given as follows:

| Object | John's Assessment |
|---|---|
| A | Negative |
| B | Negative |
| C | Positive |
| D | Negative |
| E | Negative |
| F | Negative |
| G | Negative |
| H | Negative |

The following contingency table would be the result:

| | | Norm | |
|---|---|---|---|
| | | Positive | Negative |
| John's Assessment | Positive | $n_1 = 0$ | $n_2 = 1$ |
| | Negative | $n_3 = 5 + (10 \times 90\%/(10-1)) = 6$ | $n_4 = 1 + (1 - (10 \times 90\%/(10-1))) = 1$ |

Case 1—John's assessment is positive while the norm is negative.

The probability that John's assessment is positive is calculated by:

$$p_1 = (0+1)/(0+1+6+1) = 0.125,$$

whereas the probability that the norm is negative is computed by:

$$p_2 = (1+1)/(0+1+6+1) = 0.25.$$

If John's assessment and the norm are independent of each other, the probability that John's assessment is positive, but the norm is negative is given by:

$$p=0.125\times0.25=0.03125.$$

The expected number is therefore $0.03125\times(0+1+6+1)=0.25$.

$$d = \frac{\frac{(1-0.25)}{\sqrt{0.25}}}{\left(1-\frac{(0+1)}{8}\right)\left(1-\frac{(1+1)}{8}\right)} \approx 2.29.$$

As d>1.96 (the 95th percentile of the standard normal distribution), the assessments of a significant number of objects provided by John are different from the norm at the 0.05 level of confidence. Alternatively, since d≦2.58 (the 99th percentile of the standard normal distribution), the assessments of a significant number of objects provided by John are not different from the norm at the 0.01 level of confidence.

Case 2—John's assessment is negative while the norm is positive.

The probability that John's assessment is negative is calculated by:

$$r_1=(6+1)/(0+1+6+1)=0.875,$$

whereas the probability that the norm is positive is computed by:

$$r_2=(0+6)/(0+1+6+1)=0.75.$$

If John's assessment and the norm are independent of each other, the probability that John's assessment is negative, but the norm is positive is given by:

$$r=0.875\times0.75=0.65625.$$

The expected number is therefore $0.65625\times(0+1+6+1)=5.25$.

$$d = \frac{\frac{(6-5.25)}{\sqrt{5.25}}}{\left(1-\frac{(0+6)}{8}\right)\left(1-\frac{(6+1)}{8}\right)} \approx 10.47.$$

As d>1.96 (the 95th percentile of the standard normal distribution), the assessments of a significant number of objects provided by John are different from the norm at the 0.05 level of confidence. Alternatively, since d>2.58 (the 99th percentile of the standard normal distribution), the assessments of a significant number of objects provided by John are different from the norm at the 0.01 level of confidence.

As John's assessments are different from the norm at the 0.05 level of confidence in both cases 1 and 2, we conclude that John provides contradictory assessments at the 0.05 confidence level. Alternative, since John's assessments are different from the norm at the 0.01 level of confidence in case 2, we conclude that John provides contradictory assessments at the 0.01 confidence level. If the different response is statistically correlated with the authoritative response, then it can be inferred that the response may be fraudulent with a statistical level of confidence and that the response may need to be investigated.

The results of the method may produce a list or report of suspect response. The list may be communicated to an authority or additional data may be located about the user that posted the response. In some clear cases, further responses from the user may be automatically blocked, thereby reducing fraudulent responses. Of course, additional useful results from the method are foreseeable and are contemplated.

The invention claimed is:

1. A method of evaluating a response that was inputted by a human participant, the method performed by a computing apparatus comprising storage and a processor, the method comprising:
   receiving and storing in the storage an assessment wherein the assessment comprises one selected from a group comprising a negative assessment and a positive assessment;
   creating, by the processor, and storing in the storage, a contingency table with four entries ($n_1$, $n_2$, $n_3$, $n_4$) comparing: an authoritative positive assessment and an authoritative negative assessment to a positive assessment and a negative assessment;
   if the assessment is positive and an authoritative assessment is negative ($n_2$),
      determining, by the processor, a probability that the assessment is positive ($p_1$) by dividing a number of assessments that are positive ($n_1+n_2$) by a total number of assessments (N);
      determining, by the processor, a probability that the authoritative assessment is negative ($p_2$) by dividing a number of authoritative entries that are negative ($n_2+n_4$) by the total number of assessments (N);
      multiplying, by the processor, a probability that the assessment is positive ($p_1$) by the probability that the authoritative assessment is negative (p) by the total number of assessments (N) to determine an expected entry of a positive assessment and a negative authoritative assessment (pN);
      comparing, by the processor, the expected entry (pN) to the actual entry ($n_2$):
         if the expected entry (pN) and actual entry ($n_2$) are within a threshold of each other, determining that the assessment is independent;
         if the expected entry (pN) and actual entry ($n_2$) are different by more than the threshold, determining that the assessment is not independent;
   if the assessment is negative and the authoritative assessment is positive ($n_3$),
      determining, by the processor, a probability that the assessment is negative ($r_1$) by dividing the negative assessments ($n_3+n_4$) by the total number of assessments (N);
      determining, by the processor, and storing in the storage, a probability that the authoritative assessment is positive ($r_2$) by dividing the number of authoritative entries that are positive ($n_1+n_3$) by the total number of assessments (N);
      multiplying, by the processor, and storing in the storage, the probability that the assessment is negative ($r_1$) by a probability that the authoritative assessment is positive (r) by the total number of assessments (N) to determine an expected entry of a negative assessment and a positive authoritative assessment (rN);
      comparing the expected entry (rN) to the actual entry ($n_3$):
         if the expected entry (rN) and actual entry ($n_3$) are within the threshold of each other, determining that the assessment is fraudulent; and
         if the expected entry (rN) and actual entry ($n_3$) are different by more than the threshold, determining that the assessment is not fraudulent; and storing in the storage information indicating whether the assessment was determined to be fraudulent.

2. The method of claim 1, wherein the threshold is 10%.

3. The method of claim 2, wherein the threshold is user defined.

4. The method of claim 1, wherein creating the contingency table further comprises:
   determining a positive agreement entry ($n_1$) wherein the positive agreement entry comprises a number of times a response is positive when the authoritative assessment is positive;
   determining a positive disagreement entry ($n_2$) wherein the positive disagreement entry comprises a number of times a response is positive when the authoritative assessment is negative;
   determining a negative disagreement entry ($n_3$) wherein the negative disagreement entry comprises a number of times a response is negative when the authoritative assessment is positive; and
   determining a negative agreement entry ($n_4$) wherein the negative agreement entry comprises a number of times a response is negative when the authoritative assessment is negative.

5. The method of claim 1, wherein the authoritative assessment comprises a norm of the assessment.

6. The method of claim 1, wherein the authoritative assessment comprises a community assessment.

7. The method of claim 6, wherein creating the contingency table further comprises:
   determining a positive agreement entry ($n_1$) wherein the positive agreement entry ($n_1$) comprises:
      adding the number of positive agreements ($n_1$) to the number of community assessments (m) multiplied by a result of a positive percentage of positive assessments (x %) minus one divided by the number of community assessments (m) less one; and
   determining a negative agreement entry ($n_4$) wherein the negative agreement entry ($n_4$) comprises:
      adding the number of negative agreements ($n_4$) to one less a sum of the number of community assessments (m) multiplied by the percentage of positive assessments (x %), the sum divided by the number of assessments (m) less one;
   determining a positive disagreement entry ($n_2$) wherein the positive disagreement entry ($n_2$) comprises:
      adding the number of positive disagreements ($n_2$) to one less the number of community assessments (m) multiplied by the percentage of positive answers (x %) less one divided by the number of community assessments (m) less one; and
   determining a negative disagreement entry ($n_3$) wherein the negative disagreement entry ($n_3$) comprises:
      adding the number of negative disagreements ($n_3$) to the number of community assessments (m) multiplied by the percentage of positive assessments (x %) divided by the number of assessments (m) minus on.

8. The method of claim 1, further comprising calculating an adjusted residual (d) for an entry in the contingency table, wherein the adjusted residual measures the difference between the actual and the expected entry in the contingency table.

9. The method of claim 8, wherein calculating the adjusted residual (d) further comprises dividing a standardized residual (z) by the square root of the maximum likelihood estimate of the variance of the standardized residual (v).

10. The method of claim 9, wherein the standardized residual (z) comprises the entry of positive assessment and negative authoritative assessment ($n_2$) in the contingency table less the expected value of the entry (pN) divided by the square root of the expected value of the entry (pN).

11. The method of claim 9, wherein the maximum likelihood estimate of the variance of z (v) comprises a first value multiplied by a second value wherein
   the first value comprises one less the quantity of the positive assessments ($n_1+n_2$) divided by the total number of assessment (N) and
   the second value comprises one less the negative authoritative assessments ($n_2+n_4$) divided by the number of assessments (N).

12. The method of claim 11, further comprising if the adjusted residual is greater than 1.96, there is a 95% confidence that the assessments are contradictory and if the adjusted residual is greater than 2.58, there is a 99% confidence level that the assessments are contradictory.

13. A method that is executed by a processor for determining whether a response from a participant is contradictory in an objective manner, the method comprising:
   receiving an assessment wherein the assessment comprises either a negative assessment or a positive assessment;
   creating a contingency table comparing: an authoritative positive assessment and an authoritative negative assessment to a positive assessment and a negative assessment;
   if the assessment is positive and an authoritative assessment is negative ($n_2$),
      determining a probability that the assessment is positive ($p_1$) by dividing the number of assessments that are positive ($n_1+n_2$) by a total number of assessments (N);
      determining a probability that the authoritative assessment is negative ($p_2$) by dividing a number of authoritative entries that are negative ($n_2+n_4$) by the total number of assessments (N);
      multiplying the probability that the assessment is positive ($p_1$) by the probability that the authoritative assessment is negative ($p_2$) by the total number of assessments (N) to determine the expected entry of a positive assessment and a negative authoritative assessment (pN);
      comparing an expected entry (pN) to the actual entry ($n_2$) and:
         if the expected entry (pN) and actual entry ($n_2$) within are a threshold of each other, determining that the assessment is independent;
         if the expected entry (pN) and actual entry ($n_2$) are different by more than the threshold, determining that the assessment is not independent;
   if the assessment is negative and the authoritative assessment is positive,
      determining the probability that the assessment is negative ($r_1$) by dividing the negative assessments ($n_3+n_4$) by the total number of assessments (N);
      determining the probability that the authoritative assessment is positive ($r_2$) by dividing the number of authoritative entries that are positive ($n_1+n_3$) by the total number of assessments (N);
      multiplying the probability that the assessment is negative ($r_1$) by the probability that the authoritative assessment is positive ($r_2$) by the total number of assessments (N) to determine the expected entry of a negative assessment and a positive authoritative assessment (rN);
      comparing the expected entry (rN) to the actual entry ($n_3$) and:

if the expected entry (rN) and actual entry ($n_3$) are within the threshold of each other, determining that the assessment is independent; and if the expected entry (rN) and actual entry ($n_3$) are different by more than the threshold, determining that the assessment is not independent.

14. The method of claim 13, wherein the authoritative assessment comprises one selected from a group comprising: a norm of the assessment and a community assessment.

15. The method of claim 13, wherein if there are authoritative assessments, creating the contingency table further comprises:

determining a positive agreement entry ($n_1$) wherein the positive agreement entry comprises a number of times a response is positive when the authoritative assessment is positive;

determining a positive disagreement entry ($n_2$) wherein the positive disagreement entry comprises a number of times a response is positive when the authoritative assessment is negative;

determining a negative disagreement entry ($n_3$) wherein the negative disagreement entry comprises a number of times a response is negative when the authoritative assessment is positive; and determining a negative agreement entry ($n_4$) wherein the negative agreement entry comprises a number of times a response is negative when the authoritative assessment is negative.

16. The method of claim 13, wherein if there is no authoritative assessment and the community assessment is used as the authoritative assessment, creating the contingency table further comprises:

determining a positive agreement entry ($n_1$) wherein the positive agreement entry ($n_1$) comprises:

the number of positive agreements ($n_1$) plus the number of community assessment (m) multiplied by a result of a positive percentage of positive assessments (x %) minus one divided by the number of community assessments (m) less one; and determining a negative agreement entry ($n_4$) wherein the negative agreement entry ($n_4$) comprises:

the number of negative agreements plus the quantity of one less a sum of a number of community assessments (m) multiplied by a percentage of positive assessments (x %) less one, the sum divided by the number of assessments (m) less one;

determining a positive disagreement entry ($n_2$) wherein the positive disagreement entry ($n_2$) comprises:

the number of positive disagreements ($n_2$) plus the quantity of one less the number of community assessments (m) multiplied by the percentage of positive answers (x %) less one divided by the number of community assessments (m) less one; and determining a negative disagreement entry ($n_3$) wherein the negative disagreement entry ($n_2$) comprises:

the number of negative disagreements ($n_3$) plus the number of community assessments (m) multiplied by the percentage of positive assessments (x %) divided by the number of assessments (m) minus one.

17. The method of claim 13, further comprising calculating an adjusted residual (d) for an entry in the contingency table, wherein the adjusted residual (d) measures the difference between the actual and the expected entry in the contingency table, wherein calculating the adjusted residual (d) further comprises dividing a standardized residual (z) by the square root of the maximum likelihood estimate of the variance of the standardized residual (z);

wherein the standardized residual (z) comprises the entry of positive assessment and negative authoritative assessment ($n_2$) in the contingency table less the expected value of the entry pN divided by the square root of the expected value of the entry (pN); and wherein the maximum likelihood estimate of the variance of z (v) comprises a first value multiplied by a second value wherein the first value comprises one less the quantity of the positive assessments ($n_1+n_2$) divided by the total number of assessment (N) and the second value comprises one less the negative authoritative assessments ($n_2+n_4$) divided by the number of assessments (N).

18. The computer storage medium of claim 13, further comprising if the adjusted residual is greater than 1.96, there is a 95% confidence that the assessments are contradictory and if the adjusted residual is greater than 2.58, there is a 99% confidence level that the assessments are contradictory.

19. A computer system comprising a processor for executing computer executable instructions, a memory for storing computer data and an input-output circuit, the computer executable instructions comprising instructions for determining whether a response from a participant is contradictory in an objective manner, the code executable code comprising code for:

Creating a contingency table comparing:

an authoritative positive assessment and an authoritative negative assessment to a positive assessment and a negative assessment wherein the authoritative assessment comprises one selected from a group comprising: a norm of the assessment and a community assessment; and if the assessment is positive and an authoritative assessment is negative, determining the probability that the assessment is positive ($p_1$) by dividing the number of assessments that are positive ($n_1+n_2$) by the total number of assessments (N);

determining the probability that the authoritative assessment is negative ($p_2$) by dividing the number of authoritative entries that are negative ($n_2+n_4$) by the total number of assessments (N);

multiplying the probability that the assessment is positive ($p_1$) by the probability that the authoritative assessment is negative ($p_2$) by the total number of assessments (N) to determine the expected entry of a positive assessment and a negative authoritative assessment (pN)

comparing the expected entry (pN) to the actual entry ($n_2$):

if the expected entry (pN) and actual entry ($n_2$) are within a threshold of each other, determining that the assessment is independent;

if the expected entry (pN) and actual entry ($n_2$) are different by more than the threshold, determining that the assessment is not independent;

if the assessment is negative and the authoritative assessment is positive, determining the probability that the assessment is negative ($r_1$) by dividing the negative assessments ($n_3+n_4$) by the total number of assessments (N);

determining the probability that the authoritative assessment is positive ($r_2$) by dividing the number of authoritative entries that are positive ($n_1+n_3$) by the total number of assessments (N);

multiply the probability that the assessment is negative ($r_1$) by the probability that the authoritative assessment is positive ($r_2$) by the total number of assessments (N) to determine the expected entry of a negative assessment and a positive authoritative assessment (rN);

comparing the expected entry (rN) to the actual entry ($n_3$):

if the expected entry (rN) and actual entry ($n_3$) are within the threshold of each other, determining that the assessment is independent;

if the expected entry (rN) and actual entry ($n_3$) are different by more than the threshold, determining that the assessment is not independent;

calculating an adjusted residual (d) for an entry in the contingency table, wherein the adjusted residual (d) measures the difference between the actual and the expected entry in the contingency table;

wherein calculating an adjusted residual (d) further comprises dividing a standardized residual (z) by the square root of the maximum likelihood estimate of the variance of the standardized residual (z);

wherein the standardized residual (z) comprises the entry of positive assessment and negative authoritative assessment in the contingency table ($n_2$) less the expected value of the entry (pN) divided by the square root of the expected value of the entry (pN); and wherein the maximum likelihood estimate of the variance of the standardized residual (z) comprises a first value multiplied by a second value wherein the first value comprises one less the quantity of the positive assessments ($n_1+n_2$) divided by the total number of assessment (N) and the second value comprises one less the negative authoritative assessments ($n_2+n_4$) divided by the number of assessments (N);

if the adjusted residual (d) is greater than 1.96, determining that there is a 95% confidence that the assessments are contradictory and if the adjusted residual (d) is greater that 2.58, determining that there is a 99% confidence level that the assessments are contradictory.

20. The computer system of claim 19, wherein creating the contingency table further comprises computer executable code for:

if there is an authority assessment, creating the contingency table further comprises:

determining a positive agreement entry ($n_1$) wherein the positive agreement entry ($n_1$) comprises a number of times a response is positive when the authoritative assessment is positive;

determining a positive disagreement entry ($n_2$) wherein the positive disagreement entry ($n_2$) comprises a number of times a response is positive when the authoritative assessment is negative;

determining a negative disagreement entry ($n_3$) wherein the negative disagreement entry ($n_3$) comprises a number of times a response is negative when the authoritative assessment is positive;

determining a negative agreement entry ($n_4$) wherein the negative agreement entry ($n_4$) comprises a number of times a response is negative when the authoritative assessment is negative; and if there is an not an authority assessment and there are community responses, creating the contingency table further comprises:

determining a positive agreement entry ($n_1$) wherein the positive agreement entry ($n_1$) comprises:

the positive agreement entry ($n_1$) plus the number of community assessment (m) multiplied by a result of a positive percentage of positive assessments (x %) minus one divided by the number of community assessments (m) less one; and determining a negative agreement entry ($n_4$) wherein the negative agreement entry ($n_4$) comprises:

the negative agreement entry plus the quantity of one less a sum of the number of community assessments (m) multiplied by the percentage of positive assessments (x %) less one, the sum divided by the number of assessments (m) less one;

determining a positive disagreement entry ($n_2$) wherein the positive disagreement entry ($n_2$) comprises:

the positive disagreement entry ($n_2$) plus and the quantity of one less the number of community assessments (m) multiplied by the percentage of positive answers (x %) less one divided by the number of community assessments (m) less one; and determining a negative disagreement entry ($n_3$) wherein the negative disagreement entry ($n_3$) comprises:

the negative disagreement entry ($n_3$) plus the number of community assessments (m) multiplied by the percentage of positive assessments (x %) divided by the number of assessments (m) minus one.

* * * * *

UNITED STATES PATENT AND TRADEMARK OFFICE
CERTIFICATE OF CORRECTION

PATENT NO. : 8,396,718 B2  
APPLICATION NO. : 12/143881  
DATED : March 12, 2013  
INVENTOR(S) : Au et al.

Page 1 of 1

It is certified that error appears in the above-identified patent and that said Letters Patent is hereby corrected as shown below:

In the Specification

Column 7, Line 58, delete "that" and insert -- than --, therefor.

In the Claims

Column 11, Line 56, In Claim 7, delete "on." and insert -- one. --, therefor.

Column 14, Line 6, In Claim 17, delete "pN" and insert -- (pN) --, therefor.

Column 14, Line 30, In Claim 19, delete "Creating" and insert -- creating --, therefor.

Column 15, Line 42, In Claim 19, delete "that" and insert -- than --, therefor.

Column 16, Line 17, In Claim 20, before "not" delete "an".

Signed and Sealed this  
Third Day of February, 2015

Michelle K. Lee  
*Deputy Director of the United States Patent and Trademark Office*